(12) United States Patent
Hio et al.

(10) Patent No.: US 7,005,816 B2
(45) Date of Patent: Feb. 28, 2006

(54) ELECTROMAGNETIC SUSPENSION SYSTEM FOR VEHICLE

(75) Inventors: Koji Hio, Kanagawa (JP); Masaharu Sato, Tokyo (JP); Takaaki Uno, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 141 days.

(21) Appl. No.: 10/768,701

(22) Filed: Feb. 2, 2004

(65) Prior Publication Data

US 2004/0150361 A1 Aug. 5, 2004

(30) Foreign Application Priority Data

Feb. 5, 2003 (JP) ........................... 2003-027857

(51) Int. Cl.
*H02P 3/12* (2006.01)
*B60G 17/015* (2006.01)

(52) U.S. Cl. ...................... 318/375; 318/611; 318/612; 280/707; 280/714; 280/703; 188/299

(58) Field of Classification Search ......... 318/370–376, 318/611–613; 188/299; 280/703, 714, 707; 701/37, 38
See application file for complete search history.

(56) References Cited

U.S. PATENT DOCUMENTS

| | | | | |
|---|---|---|---|---|
| 5,060,959 A | * | 10/1991 | Davis et al. ............. | 280/5.514 |
| 5,150,915 A | * | 9/1992 | Hoptry et al. ........... | 188/266.4 |
| 5,150,916 A | * | 9/1992 | Petrofes et al. .......... | 188/266.4 |
| 5,189,615 A | * | 2/1993 | Rubel et al. ................... | 701/37 |
| 5,360,089 A | * | 11/1994 | Nakamura et al. ....... | 188/266.4 |
| 5,401,052 A | * | 3/1995 | Yoshioka et al. ........ | 280/5.503 |
| 5,559,701 A | * | 9/1996 | Shimizu et al. ............... | 701/36 |
| 5,571,058 A | | 11/1996 | Schmidt | |
| 5,586,032 A | * | 12/1996 | Kallenbach et al. .......... | 701/45 |
| 5,718,446 A | * | 2/1998 | Fuchida ............... | 280/124.157 |
| 5,779,009 A | * | 7/1998 | Iwasaki ....................... | 701/37 |
| 5,839,082 A | * | 11/1998 | Iwasaki ....................... | 701/38 |

FOREIGN PATENT DOCUMENTS

| | | |
|---|---|---|
| DE | 196 06 771 A1 | 8/1997 |
| DE | 199 09 424 A1 | 8/2000 |
| JP | 8-295140 A | 11/1996 |
| JP | 2000-142146 A | 5/2000 |
| JP | 2002-48189 A | 2/2002 |
| JP | 2002-192931 A | 7/2002 |
| JP | 2003-34153 A | 2/2003 |
| WO | WO 01/10665 A1 | 2/2001 |
| WO | WO 01/85483 A1 | 11/2001 |
| WO | WO 02/087909 A1 | 11/2002 |

\* cited by examiner

*Primary Examiner*—Paul Ip
(74) *Attorney, Agent, or Firm*—Foley & Lardner LLP

(57) ABSTRACT

An electromagnetic suspension system for a vehicle, comprises an electromagnetic actuator interposed between a sprung mass and an unsprung mass and disposed substantially in parallel with an spring element. An electric motor is provided for driving the electromagnetic actuator. A motor controller is configured to calculate a displacement input applied to the electromagnetic actuator and to control the electric motor in a manner that the electromagnetic actuator generates an optimum damping force corresponding to the displacement input. A motor control circuit is provided for the electric motor, through which the electric motor is connected to the motor controller. Additionally, an electrical damping element is electrically connected to the motor control circuit and in parallel with the electric motor to generate a damping force in a passive manner under a dynamic braking of the electric motor in response to the displacement input to the electromagnetic actuator from the unsprung mass.

7 Claims, 6 Drawing Sheets

ELECTROMAGNETIC SUSPENSION SYSTEM FOR VEHICLE

BACKGROUND OF THE INVENTION

This invention relates to improvements in an electromagnetic suspension system for a vehicle, including an electromagnetic actuator (called an electromagnetic damper) which makes vibration damping for a suspension under a power source of electricity and is employed in place of a hydraulic damper which makes vibration damping under a viscosity resistance of hydraulic fluid or oil.

Conventional electromagnetic suspension systems for a vehicle interchangeably use an active control and a passive control under the action of a coil-connection changeover device. In the active control, a damping force is controlled by providing energy to an electromagnetic actuator from the outside. In the passive control, a damping force is obtained under a dynamic braking of an electric motor. Such an electromagnetic suspension system is disclosed in Japanese Patent Provisional Publication No. 2002-48189.

SUMMARY OF THE INVENTION

However, in such an electromagnetic suspension system, a changeover between the active control and the passive control is made. Accordingly, for example, in case that a vibration input is applied from tires during the active control for accomplishing an attitude control of the vehicle, this vibration input is also tackled by the active control to accomplish a vibration control. As a result, both the attitude control and the vibration control are required to be simultaneously accomplished under a motor control in an active manner. This not only complicates the active control but also degrading an energy efficiency.

It is, therefore, an object of the present invention to provide an improved electromagnetic suspension system for a vehicle, which can effectively overcome drawbacks encountered in conventional electromagnetic suspension systems for vehicles.

Another object of the present invention is to provide an improved electromagnetic suspension system for a vehicle, which not only simplifies an active control for an electromagnetic actuator but also improves an energy efficiency.

A further object of the present invention to provide an improved electromagnetic suspension system for a vehicle, in which an active control is made on control-objective input forces while input forces other than the control-objective forces can be tackled in a passive manner.

An aspect of the present invention resides in an electromagnetic suspension system for a vehicle, which comprises an electromagnetic actuator interposed between a sprung mass and an unsprung mass and disposed substantially in parallel with an spring element. An electric motor is provided for driving the electromagnetic actuator. A motor controller is configured to calculate a displacement input applied to the electromagnetic actuator and to control the electric motor in a manner that the electromagnetic actuator generates an optimum damping force corresponding to the displacement input. A motor control circuit is provided for the electric motor, through which the electric motor is connected to the motor controller. Additionally, an electrical damping element is electrically connected to the motor control circuit and in parallel with the electric motor to generate a damping force in a passive manner under a dynamic braking of the electric motor in response to the displacement input to the electromagnetic actuator from the unsprung mass.

Another aspect of the present invention resides in an electromagnetic suspension system for a vehicle, an electromagnetic actuator interposed between a sprung mass and an unsprung mass and disposed substantially in parallel with an spring element. An electric motor is provided for driving the electromagnetic actuator. Motor control means is provided for calculating a displacement input applied to the electromagnetic actuator and controlling the electric motor in a manner that the electromagnetic actuator generates an optimum damping force corresponding to the displacement input. A motor control circuit is provided for the electric motor, through which the electric motor is connected to the motor control means. Additionally, an electrical damping element is electrically connected to the motor control circuit and in parallel with the electric motor to generate a damping force in a passive manner under a dynamic braking of the electric motor in response to the displacement input to the electromagnetic actuator from the unsprung mass.

DETAILED DESCRIPTION OF THE INVENTION

Figure 1:
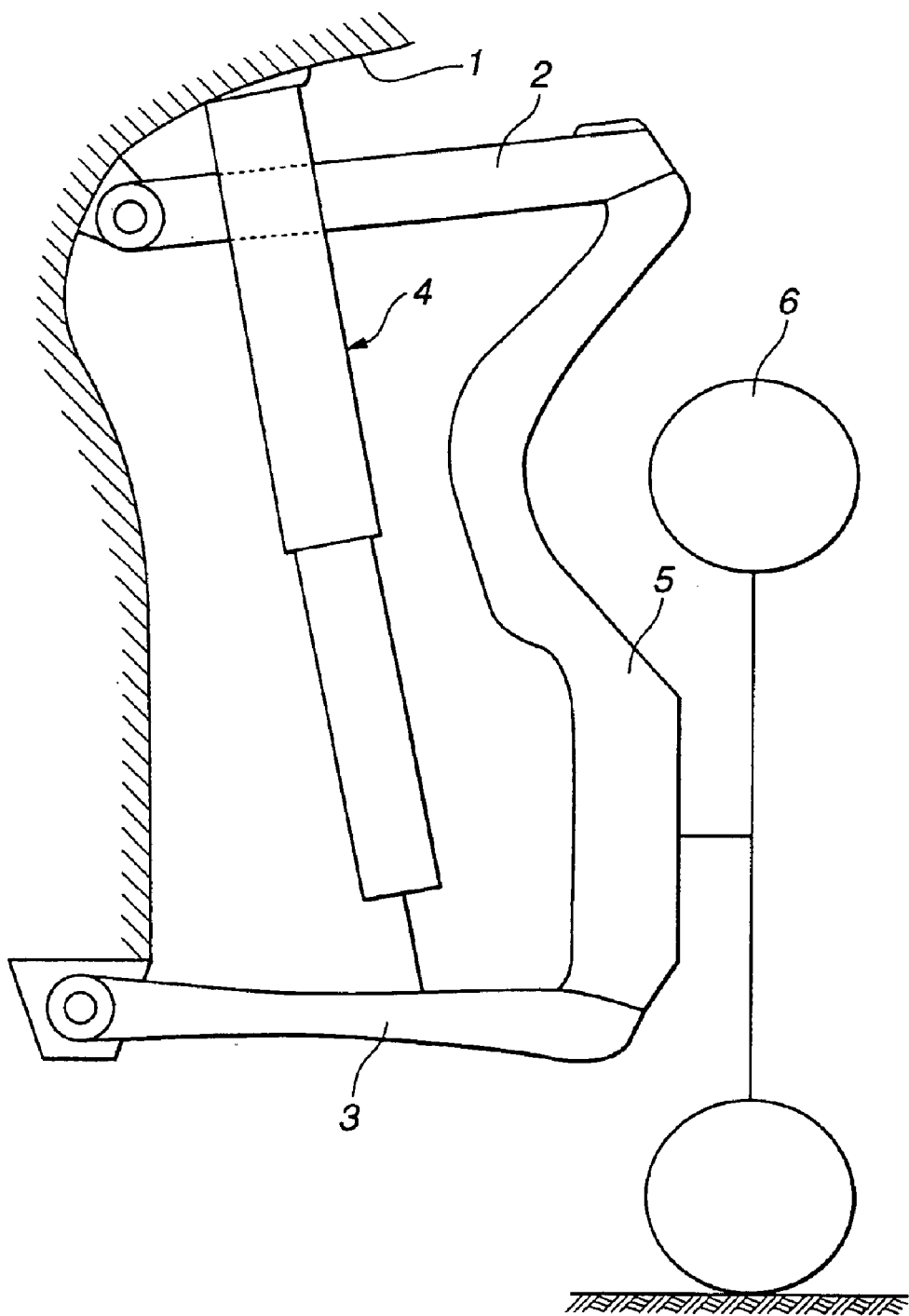
FIG. 1 is a schematic illustration of a first embodiment of a magnetic suspension system for a vehicle, according to the present invention.

Referring now to FIG. 1, an embodiment of an electromagnetic suspension system according to the present invention is illustrated in combination with a vehicle body 1 of an automotive vehicle. The suspension system includes upper link 2 and lower link 3 which are generally parallelly arranged and connected at their one end with the vehicle body 1 (sprung mass). The other ends of upper link 2 and lower link 3 are connected by axle or knuckle 5 to which a tire 6 (unsprung mass) is rotatably connected. An electromagnetic actuator 4 is disposed between vehicle body 1 and lower link 3, and employed in place of a shock absorber or hydraulic damper used in a multi-link type independent suspension system. The electromagnetic actuator 4 is disposed in parallel with spring element 7 shown in FIG. 3 and driven by electric motor 8 shown in FIG. 2.

Figure 2:
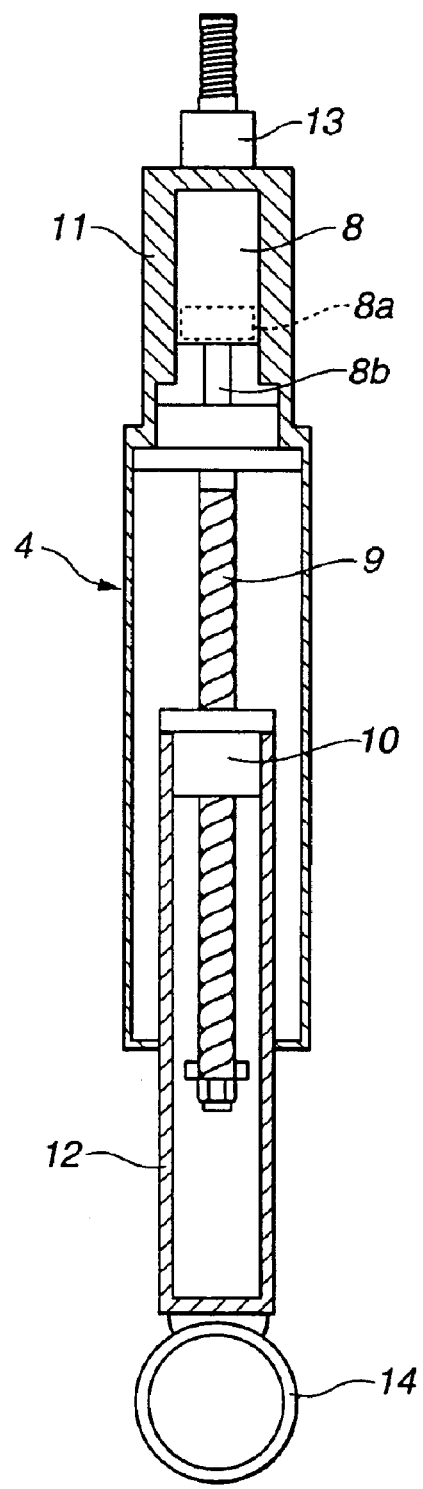
FIG. 2 is a vertical sectional view of an electromagnetic actuator in the magnetic suspension system of FIG. 1.

As shown in FIG. 2, the electromagnetic actuator 4 includes electric motor 8 which is disposed inside an upper end section of outer tube 11 and has a rotatable motor shaft fixed to a rotor of electric motor 8. The rotatable motor shaft is provided with a decelerator 8a from which deceleration shaft 8b projects. Ball screw 9 is connected to the deceleration shaft 8b and threadedly engaged with ball screw nut 10 so that the rotational movement of ball screw shaft 9 is converted into a linear movement of ball screw nut 10 while the linear movement of ball screw nut 10 is converted into the rotational movement of the ball screw shaft 9.

Inner tube 12 is fixed to ball screw nut 10 in such a manner as to cover ball screw shaft 9. Link support eye 14 is fixed to the lower end of inner tube 12. Outer tube 11 extends in such a manner as to cover the upper section of inner tube 12. Vehicle body support bolt 13 is fixed to the upper end of outer tube 11, and is fixedly supported through an insulator (not shown) to vehicle body 1. Link support eye 14 is supported through a bushing (not shown) to lower link 3.

Figure 3:
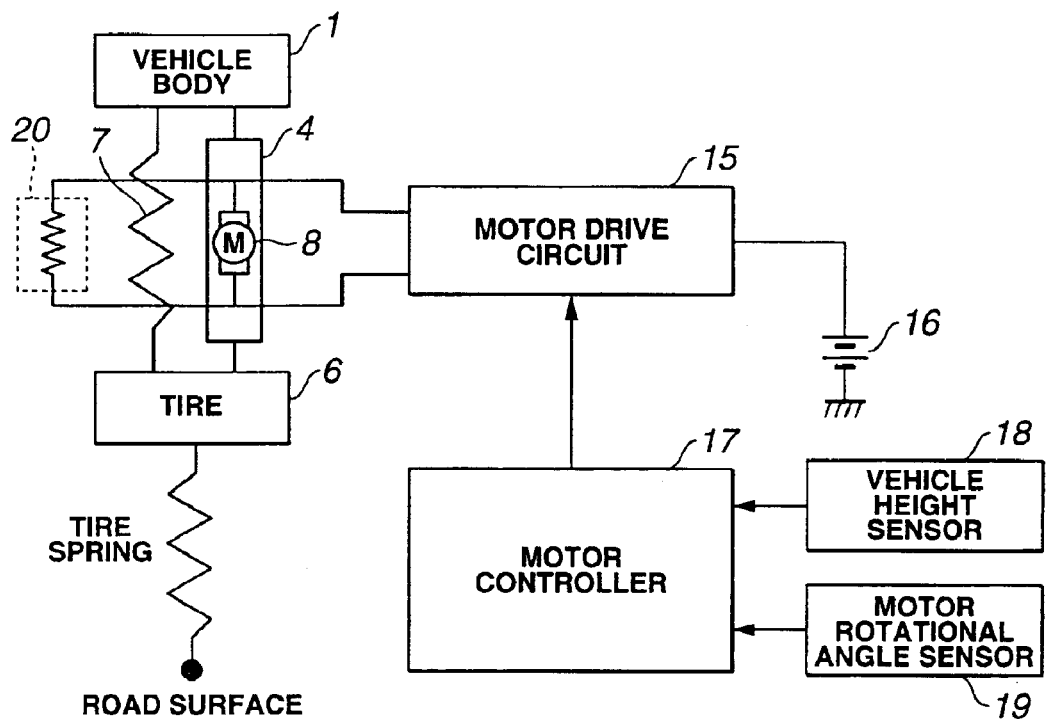
FIG. 3 is a block diagram of a quarter vehicle body model having vertical two degrees of freedom, of the electromagnetic suspension system of FIG. 1, provided with a motor control system for the electromagnetic actuator of FIG. 2.
Figure 4:
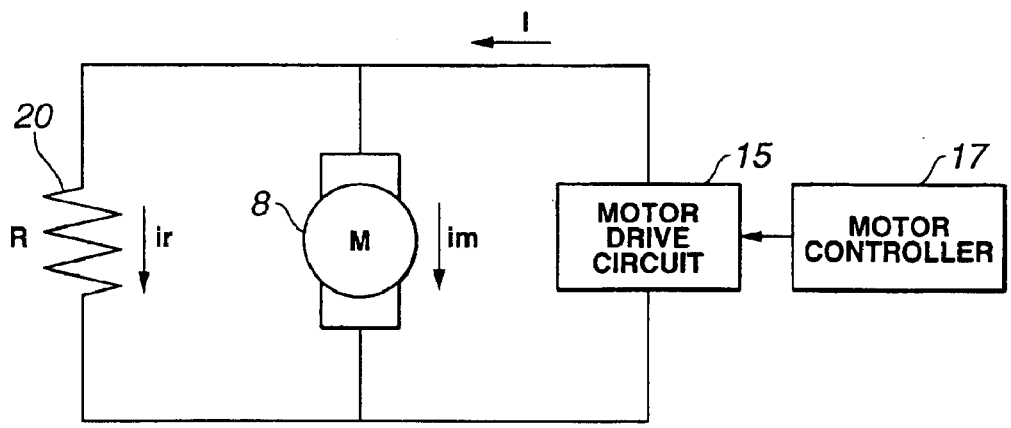
FIG. 4 is a circuit diagram of a motor control circuit for the electric motor, including the electric motor and an electric resistor, in the magnetic suspension system of FIG. 1.

Electromagnetic actuator 4 will be discussed in detail hereinafter with reference to FIGS. 3 and 4. FIG. 3 is a block diagram illustrating a quarter vehicle body model having vertical two degrees of freedom, of the first embodiment electromagnetic suspension system and a motor control system for electromagnetic actuator 4. FIG. 4 is a circuit diagram of a motor control circuit for electric motor 8 of electromagnetic actuator 4.

When the first embodiment electromagnetic suspension system is represented as the quarter vehicle body model having vertical two degrees of freedom, spring element 7 and electromagnetic actuator 4 are arranged parallel with each other and interposed between vehicle body 1 as the sprung mass and tire 6 as the unsprung mass. Additionally, a tire spring is provided between tire 6 and the surface of road. Motor drive circuit 15 is electrically connected to electric motor 8 to control the electric motor. Motor drive circuit 15 is electrically connected to a battery as a power source.

Motor controller 17 is electrically connected to the motor drive circuit 15 and also to vehicle height sensor 18 and motor rotational angel sensor 19. Vehicle height sensor 18 is adapted to detect a height of the vehicle and output a sensor signal representative of the vehicle height. Motor rotational angle sensor 19 is adapted to detect a rotational angle of electric motor 8 and to output a sensor signal representative of the motor rotational angle. Motor controller 17 is arranged to receive the sensor signals output from vehicle height sensor 18 and motor rotational angle sensor 19 and impress or output to electric motor 8 a current value which is determined in accordance with the sensor signals output from vehicle height sensor 18 and motor rotational angle sensor 19.

Motor drive circuit 15 is also electrically connected to electric resistor (electrical damper element) 20 which is electrically connected in parallel with electric motor 8. Electric resistor 20 is arranged to generate a damping force in a passive manner (control) under a dynamic braking of electric motor 8 when a displacement input is applied to electromagnetic actuator 4 from the unsprung mass. Electric resistor 20 is located at a site higher in cooling efficiency than the inside of a wheel house, for example, a site near and under a floor of the vehicle (high in air flow speed), a front section of the vehicle and a position around an opening section of a rear bumper, or a site which requires a heat source, such as a rear defogger.

[Motor Control Processing]

Next, a motor control processing for electric motor 8 in the first embodiment electromagnetic suspension system will be discussed with reference to a flowchart of FIG. 5. The flowchart illustrates a flow of the control processing for electric motor 8, executed in motor controller 17 serving as means for controlling electric motor 8 in the first embodiment electromagnetic suspension system. Explanations will be hereinafter made on each step of the flowchart. This motor control processing employs a control rule for making a control in response to a rotational angular velocity (or stroke velocity) of electric motor 8 in an active manner (control), compensating an internal inertia of electromagnetic actuator 4. This control rule is one of optional control rules.

At step S1, detection is made to obtain a variety of quantities of states required for executing the control rule for electric motor 8 or electromagnetic actuator 4 set in the first embodiment electromagnetic suspension system, or quantities of states by which the above variety of quantities of states can be calculated. Such quantities of states include a stroke acceleration a of electromagnetic actuator 4 and a rotational angular velocity ω of electric motor 8, or quantities of states by which the stroke acceleration and the rotational angular velocity can be calculated. In the first embodiment electromagnetic suspension system, a vehicle height value obtained from the sensor signal (value) of the vehicle height sensor 18 is used as the quantity of state by which the stroke acceleration a of electromagnetic actuator 4 can be calculated. The vehicle height value is time-differentiated to obtain a stroke velocity, and then the stroke velocity is further time-differentiated to obtain the stroke acceleration a. A motor rotational angle obtained from the sensor value of motor rotational angle sensor 19 is employed as the quantity of state by which the rotational angular velocity ω of electric motor 8 can be calculated, and then the motor rotational angle is time-differentiated thereby to obtain the rotational angular velocity ω of electric motor 8.

Figure 6:
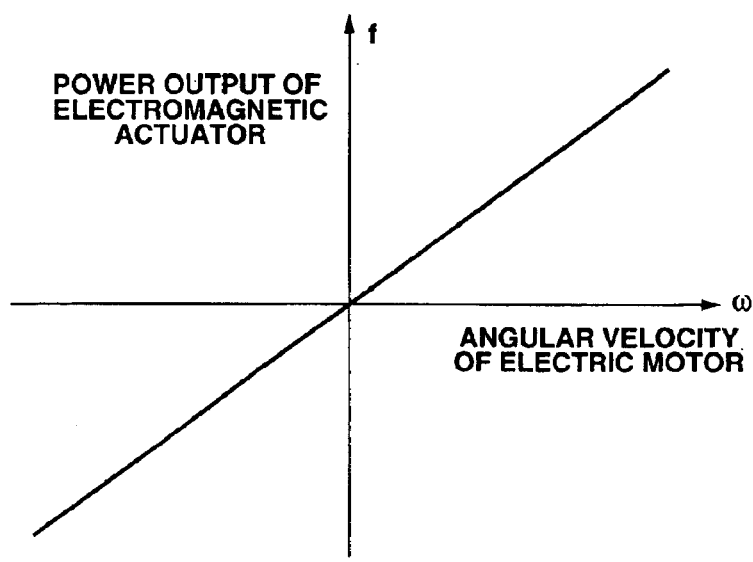
FIG. 6 is a graph of a characteristic of the power output of the electromagnetic actuator relative to the angular velocity of the electric motor, used in the motor control processing of FIG. 5.

At step S2, an actuator power output f (output of electromagnetic actuator 4) according to the motor rotational angular velocity ω is calculated based on the motor rotational angular velocity ω obtained at step S1 and an actuator output characteristics shown in FIG. 6.

At step S3, an internal inertia force fi of electromagnetic actuator 4 is calculated by using Eq. (3) shown below. In Eq. (3), the stroke acceleration a obtained at step S1 is multiplied by an equivalent inertia mass Im (a constant determined by the system). Specifically, the displacement input (velocity: v, and acceleration: a) is applied to electromagnetic actuator 4. Here, a total inertia moment J is obtained by adding an inertia moment of the rotor of electric motor 8 to inertia moments which are obtained by converting the inertia masses and inertia moments of all the sections which make their displacement and rotation under stroke of electromagnetic actuator 4 into positions of the rotor of electric motor 8. Ball screw shaft 9 has a lead L. Decelerator 8a has a speed reduction ratio α. With these, the electric motor 8 is rotated with an angular acceleration dω/dt under an input force applied to electric actuator 4, given by Eq. (1):

$$d\omega/dt = a \times (2\pi/L) \times \alpha \quad (1)$$

Accordingly, an inertia torque generated here is given by Eq. (2):

$$Ti = J \cdot d\omega/dt = J \times a \times (2\pi/L) \times \alpha \quad (2)$$

Therefore, the internal inertia force fi of electromagnetic actuator 4 is presented by Eq. (3):

$$fi = Ti \times \alpha \times (2\pi/L) = J \times \{(2\pi/L) \times \alpha\}^2 \times a = Im \times a \quad (3)$$

$$\text{where } Im = J \times \{(2\pi/L) \times \alpha\}^2 \quad (4)$$

It is to be noted that $Im = J \times \{(2\pi/L) \times \alpha\}^2$ is an equivalent inertial mass which is obtained by converting the inertia masses and inertia moments of all the sections which make their displacement and rotation according to stroke of electromagnetic actuator 4 into a direction of the stroke, inside electromagnetic actuator 4. This equivalent inertia mass Im is given as a constant by the type of the system, design values and the like, and therefore is previously measured.

At step S4, a motor power output fm of electric motor 8 is calculated by adding the actuator power output f calculated at step S2 to the internal inertia force fi of electromagnetic actuator 4 calculated at step S3.

At step S5, a current value im for electric motor 8, required to obtain the motor power output fm calculated at step S4 is calculated.

At step S6, a command value (control signal) for flowing current having the required current value im to electric motor 8 calculated at step S5 is output to motor drive circuit 15, and a flow goes to step S1.

[Damping Action under Active and Passive Controls]

Hereinafter, damping action under active control and passive control in the first embodiment electromagnetic suspension system will be discussed.

Figure 5:
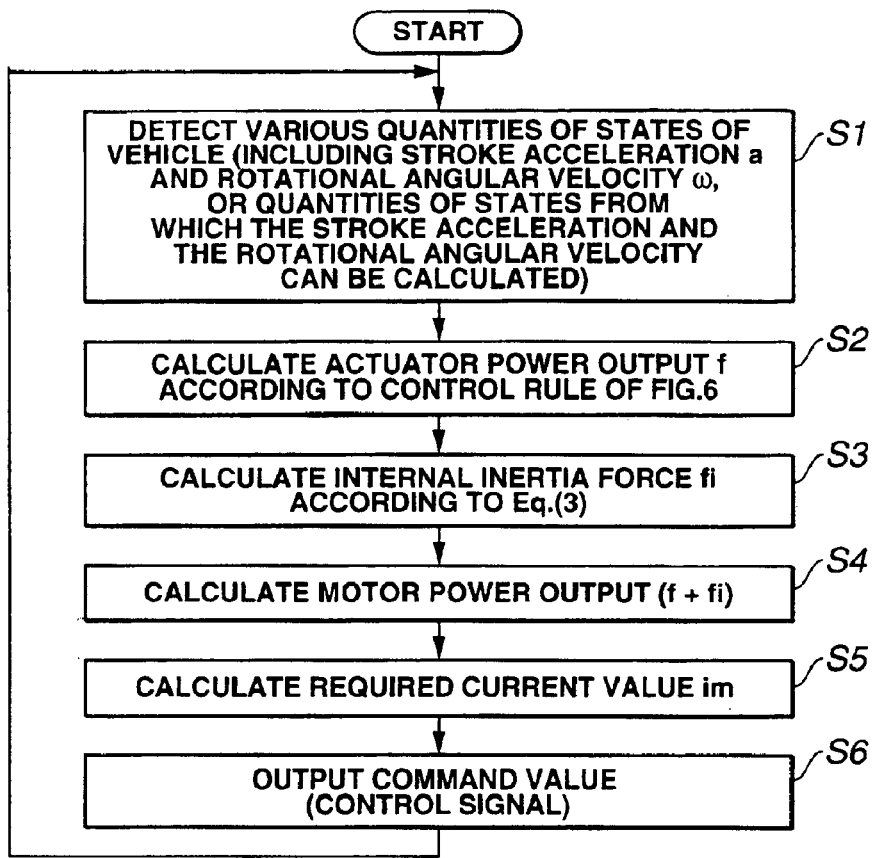
FIG. 5 is a flowchart of a motor control processing for the electric motor, executed in a motor controller in the magnetic suspension system of FIG. 1.

The active control for electric motor 8 by motor controller 17 is executed, for example, according to the flowchart of FIG. 5, in which when the current value required for electric motor 8 of electromagnetic actuator 4 is im, a control current value I of the motor control circuit of FIG. 4 is calculated from a resistance value R of electric resistor 20 electrically connected in parallel with electric motor 8 having an internal resistance value r, by Eq. (5):

$$I = im + ir = im + (r/R) \cdot im = \{(R+r)/R\} \cdot im \quad (5)$$

At this time, motor controller 17 makes a current control for allowing a current having the initial control current value I to flow to motor control circuit. When an input force which cannot be detected by the various sensors such as vehicle height sensor 18 and the like, or an input force which is intentionally not detected is applied, an induced electromotive force e is generated in electric motor 8 so that a change in circuit voltage occurs.

The induced electromotive force e generated by electric motor 8 is proportional to the velocity (dz/dt) of the input force, providing a proportional constant ke. At this time, assuming that a current flowing through electric resistor 20 is ir', and a current flowing through electric motor 8 is im', the following relationship given by Eqs. (6), (7), (8) and (9) is established:

$$im' + ir' = I \quad (6)$$

$$im' \cdot r + e = ir' \cdot R \quad (7)$$

$$e = ke \cdot (dz/dt) \quad (8)$$

$$\text{Therefore, } im' = im - \{ke/(R+r)\} \cdot (dz/dt) \quad (9)$$

Thus, according to Eq. (9), in case that only the current control (active control) is made for being intended to a low frequency vibration control including the attitude control for the vehicle, it will be understood that even if an abrupt input force which is not taken into consideration in the active control for electric motor 8 is applied, a current change depending upon a velocity is made to generate a damping force against the abrupt input force. In other words, by combining the motor control circuit as shown in FIG. 4 into the electromagnetic suspension system, even during making the active control for electric motor 8, the input force other than the objective input force can be simultaneously tackled in the passive manner (control). Here, assuming that an output constant of electric motor 8 is km, the motor control circuit can provide the same effect as that obtained in a case that a shock absorber having a damping coefficient of ke·km/(R+r) is disposed in parallel with electromagnetic actuator 4.

Furthermore, the damping element equivalent to a shock absorber or the like is constituted of the closed circuit including electric resistor 20 and electric motor 8, in which the frequency of a current gain due to the resistance value R of electric resistor 20 exhibits a characteristics due to a generally constant gain regardless of high and low in frequency thereby exhibiting a generally constant damping function throughout all frequency ranges. Therefore, even in case that an active (motor) control system cannot operate owing to failure or the like, a damping force can be developed against an output force from tire 6 under the passive control.

Next, effects of the first embodiment electromagnetic suspension will be discussed.

(1) The electromagnetic suspension system for a vehicle, comprises the electromagnetic actuator interposed between the sprung mass and the unsprung mass and disposed substantially in parallel with the spring element. The electric motor is provided for driving the electromagnetic actuator. The motor controller is configured to calculate the displacement input applied to the electromagnetic actuator and to control the electric motor in a manner that the electromagnetic actuator generates an optimum damping force corresponding to the displacement input. The motor control circuit is provided for the electric motor, through which the electric motor is connected to the motor controller. Additionally, the electrical damping element is electrically connected to the motor control circuit and in parallel with the electric motor to generate a damping force in a passive manner under a dynamic braking of the electric motor in response to the displacement input to the electromagnetic actuator from the unsprung mass. Accordingly, while the active control is made on the objective input forces, input forces other than the objective input forces can be tackled in the passive manner. This not only makes the active control simple but also improves an energy efficiency.

(2) Electric resistor 20 is used as the electrical damping element, and therefore the following effects can be obtained in addition to the effects in the above (1): Even in case that the active control system for electric motor 8 does not operate owing to failure or the like, a damping force can be generated against an input force under the passive control though the control circuit for electric motor 8 is simple in arrangement.

(3) The closed circuit constituted of electric resistor 20 and electric motor 8 is set to be equivalent to a damper which has a damping coefficient ke·km/(R+r), against the displacement input from the unsprung mass, in which ke is a proportional constant for an input velocity of an induced electromotive force e generated by electric motor 8; km is an output constant of electric motor 8; R is a resistance value of electric resistor 20 connected in parallel with electric motor 8; and r is an internal resistance value of electric motor 8. Accordingly, it is possible to exhibit, against the input force to electromagnetic actuator 4, the damping function equivalent to that in a case that a damper element having a damping coefficient of ke·km/(R+r) is disposed in parallel with electromagnetic actuator 4. Additionally, it is easily made to set electromagnetic actuator 4 to exhibit a required damping performance by suitably setting the resistance value R of the electric resistor 20. Thus, in case that the electric resistor is used as the electrical damping element, the closed circuit constituted of the electric resistor and the electric motor is made to be equivalent to the damper having the damping coefficient according to the resistance value of the electric resistor.

(4) Electric resistor 20 is located at a site higher in cooling efficiency than the inside of a wheel house, or a site which requires a heat source. This suppresses a change of electric resistor 20 in electrical properties due to thermal influence, thereby providing a stable damping characteristics. Additionally, for example, in case that electric resistor 20 is disposed at the site requiring the heat source, such as a case where electric resistor 20 is applied as a part or whole of the rear defogger, electric resistor 2 can be provided with two functions (a damping function and a heat source function) thereby making it possible to lower a production cost and achieving an effective use of thermal energy.

Figure 7:
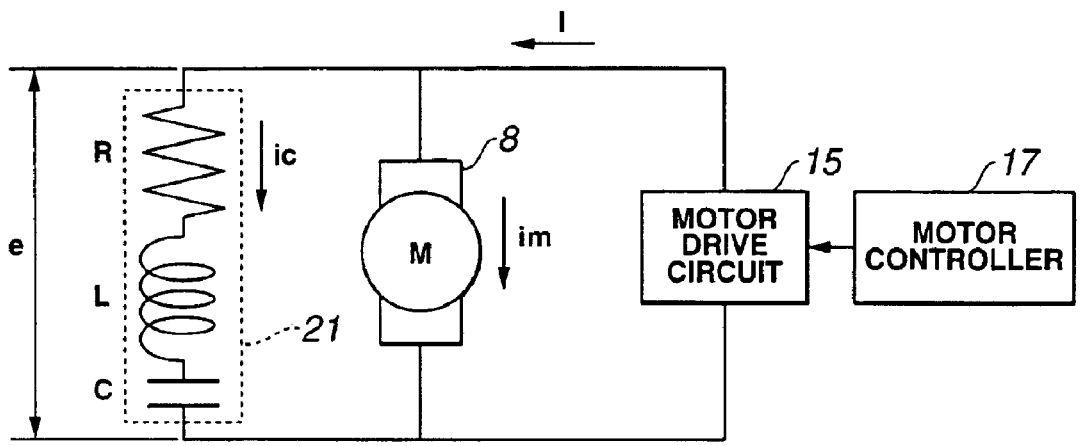
FIG. 7 is a circuit diagram similar to FIG. 4 but showing a motor control circuit for the electric motor, including the electric motor and an electric resonance circuit, in a second embodiment of the magnetic suspension system according to the present invention.
Figure 8:
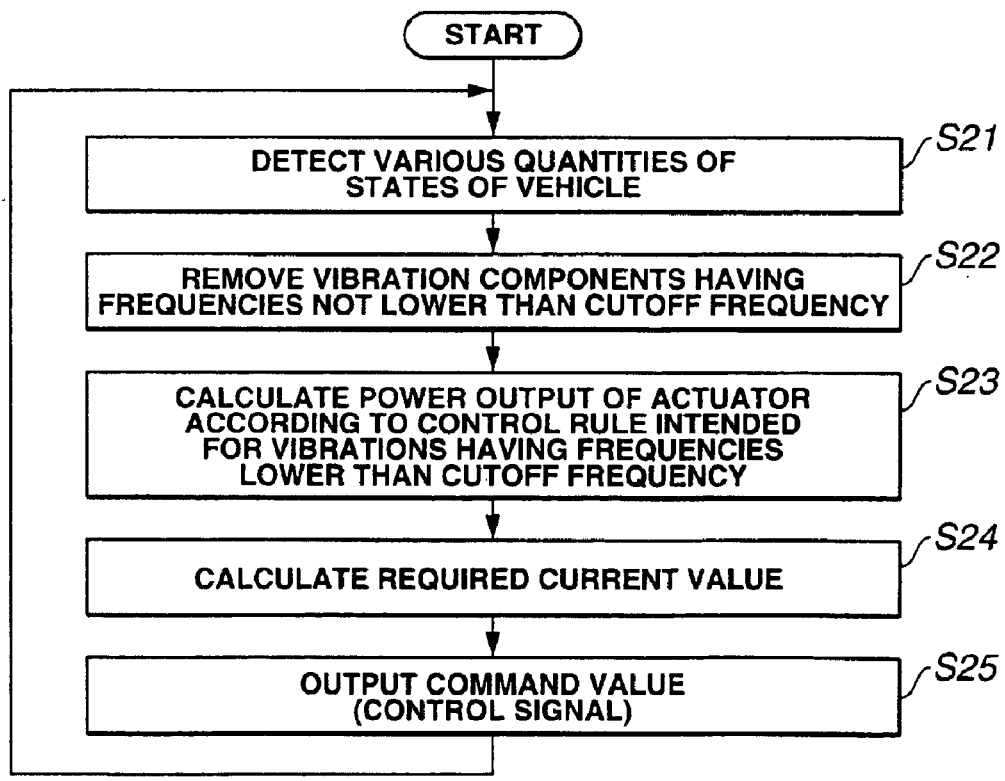
FIG. 8 is a flowchart similar to FIG. 5 but showing the motor control processing for the electric motor, executed in the motor controller in the magnetic suspension system of FIG. 7.
Figure 9:
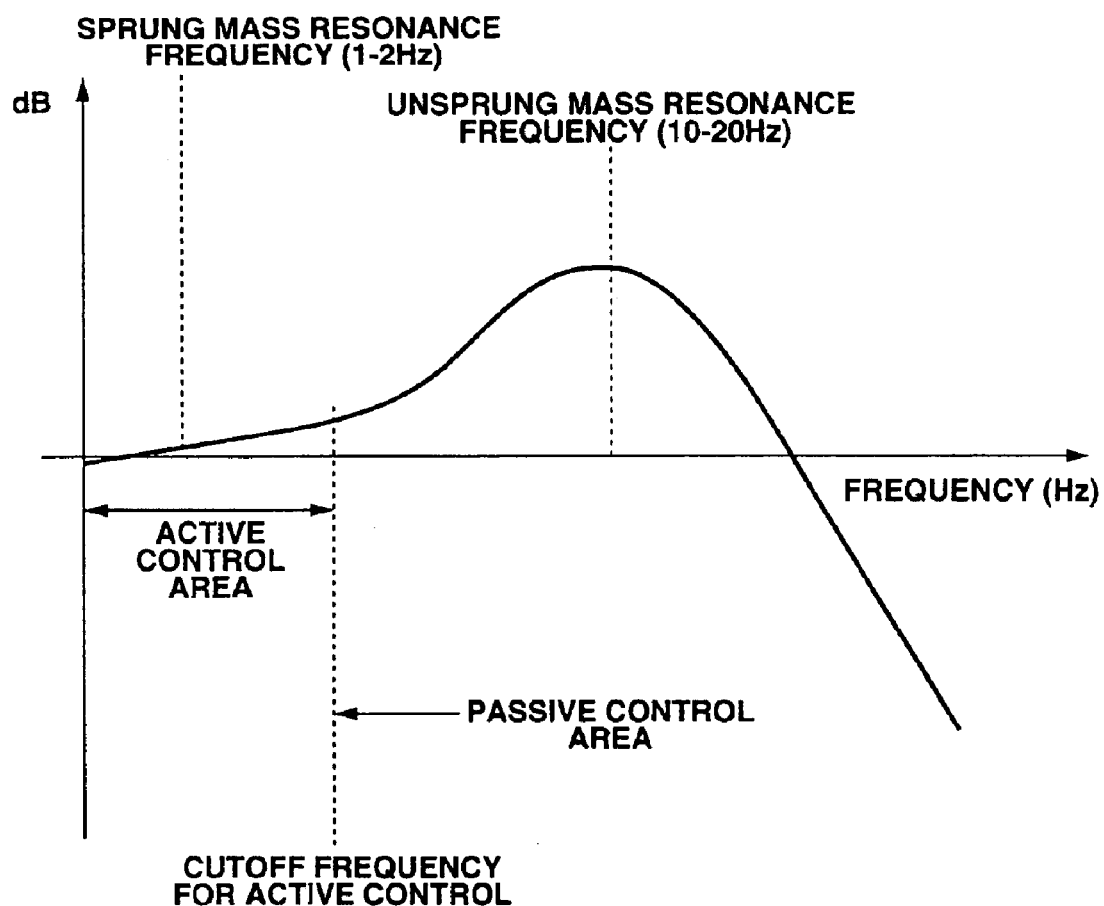
FIG. 9 is a graph showing a current gain frequency characteristics of an electric resonance circuit in the motor control circuit of FIG. 7.

FIGS. 7, 8 and 9 illustrate a second embodiment of a magnetic suspension system similar to the first embodiment magnetic suspension system with the exception that electric resonance circuit 21 is used as the electrical damping element.

More specifically, as shown in FIG. 7, the motor control circuit for electric motor 8 is provided with electric resonance circuit 21 serving as the electrical damping element for generating a damping force in a passive manner under the dynamic braking of electric motor 8 against the displacement input from the unsprung mass. Electric resonance circuit 21 is connected in parallel with electric motor 8. This electric resonance circuit 21 has a resonance frequency which is set to be coincident with the resonance frequency of the unsprung mass (for example, 10 to 20 Hz) and includes a resistor R, a coil L and a capacitor C.

Electric resonance circuit 21 is located at a site higher in cooling efficiency than the inside of the wheel house, for example, the site near and under the floor of the vehicle (high in air flow speed), the front section of the vehicle and the position around an opening section of a rear bumper, or the site which requires a heat source, such as a rear defogger, similarly to electric resistor 20 in the first embodiment electromagnetic suspension system.

Motor controller 17 in this second embodiment electromagnetic suspension system is arranged to set, as a cutoff frequency, a frequency lower than a unsprung mass resonance frequency (the resonance frequency of the unsprung mass) and higher than a sprung mass resonance frequency (the resonance frequency of the spring mass), as shown in FIG. 9 where the active control is made in an active control area while the passive control is made in a passive control area. The unsprung mass resonance frequency is, for example, within a range of from 10 to 20 Hz, while the sprung mass resonance frequency is, for example, within a range of from 1 to 2 Hz. With this, vibrational components within a high frequency range of not lower than the cutoff frequency, of the displacement input to electromagnetic actuator 4 is removed, so that only vibrational components within a low frequency range including the sprung mass resonance frequency becomes the object to be controlled. Then, electric motor 8 is controlled in the active manner in order to obtain an optimum damping force. It will be understood that the other arrangement of the second embodiment electromagnetic suspension system is similar to that in the first embodiment electromagnetic suspension system, and therefore illustration and explanation of the other arrangement is omitted for the purpose of simplicity.

[Motor Control Processing]

Next, motor control processing for electric motor 8 in the second embodiment electromagnetic suspension will be discussed with reference to a flowchart of FIG. 8. The flowchart illustrates a flow of the control processing for electric motor 8, executed in motor controller 17 in the second embodiment electromagnetic suspension system. Explanations will be hereinafter made on each step of the flowchart.

At step S21, detection is made to obtain a variety of quantities of states required for executing the control rule for electric motor 8 or electromagnetic actuator 4 set in the second embodiment electromagnetic suspension system, or quantities of states by which the above variety of quantities of states can be calculated.

At step S22, vibration components having frequencies of not lower than the cutoff frequency, of vibrations input to electromagnetic actuator 4 is removed.

At step S23, the actuator power output f is calculated in accordance with a control rule intended for the vibrations having frequencies lower than the cutoff frequency is calculated.

At step S24, the current value im for electric motor 8, required to obtain the actuator power output f is calculated.

At step S25, a command value (control signal) for flowing current having the current value im to electric motor 8 calculated at step S24 is output to motor drive circuit 15, and a flow goes to step S21.

[Damping Action under Active and Passive Controls]

Hereinafter, damping action under active control and passive control in the second embodiment electromagnetic suspension system will be discussed.

When motor controller 17 makes the active control, for example, the attitude control for the vehicle, based on the flowchart of FIG. 8 and in accordance with the signals from the various sensors and other on-board units (not shown), the attitude control can be regarded as a control within an extremely low frequency range. Accordingly, the motor drive circuit 15 operated by a command from motor controller 17 generates the control current value I having an extremely low frequency, upon which this control current value I is controlled. Here, on the basis of FIG. 9 which exhibits a frequency characteristics of electric resonance circuit 21, the gain of current in the low frequency range is small, and therefore the control current value I which is provided by motor drive circuit 15 can be provided, as it is, to electric motor 8 of electromagnetic actuator 4, thereby accomplishing an effective attitude control.

At this time, when high frequency micro-vibration (due to road surface unevenness) which cannot disturb the attitude of the vehicle is added to the vehicle, the induced electromotive force e is generated in the motor control circuit for electric motor 8. However, if the control current value I for the active control is maintained as a value which has been commanded, a current ic induced by this voltage change passes through only the electric resonance circuit 21 thereby changing the current I flowing through the motor control circuit, according to Kirchhoff's law. Further, if the frequencies of the vibrations input to the electromagnetic suspension system is around the resonance frequency of the unsprung mass, the sufficient induced current ic flows through the electric resonance circuit 21, thereby providing, in a passive manner, a damping force for damping resonance vibration of the unsprung mass, as shown in FIG. 9.

In other words, while motor controller 17 only accomplishes vibration control within a low frequency range, including an attitude change of the vehicle, the dynamic braking of electric motor 8 can generated a damping force against input of vibrations having frequencies of not lower than the cutoff frequency under the dynamic braking of electric motor 8 though the action of the active control is made. Additionally, during the vibration control within the low frequency range, motor controller 17 applies voltage not only to electric motor 8 but also to electric resonance circuit 21; however, by virtue of the frequency characteristics of the motor control circuit in FIG. 9, much current component for the active control flows through electric resonance circuit, thereby effectively accomplishing the active control.

Next, effects of the second embodiment electromagnetic suspension system will be discussed. The second embodiment electromagnetic suspension system exhibits the above-mentioned effects (1), (2), (3) and (4) in the first embodiment electromagnetic suspension system and additionally exhibits the following effects (5) and (6):

(5) The electrical damping element is electric resonance circuit 21 including the resistor R, the coil L and the capacitor C and has a resonance frequency which is set to be coincident with the unsprung mass resonance frequency. This can accomplish both the effective active control against the control-objective input force within the low frequency range including the sprung mass resonance frequency and the effective passive control against the control-objective input force around the unsprung mass resonance frequency.

(6) In motor controller 17, the frequency lower than the unsprung mass resonance frequency and higher than the sprung mass resonance frequency is set as the cutoff frequency, so that the vibration components within a high frequency range of not lower than the cutoff frequency, of the displacement inputs to electromagnetic actuator is removed while only the vibration components within a low frequency range including the sprung mass resonance frequency becomes a control object, thus controlling electric motor 8 in the active manner in order to obtain an optimum damping force. Accordingly, motor controller 17 can be devoted entirely to the vibration control for the vibrations within the low frequency range including an attitude change of the vehicle. Against input of the vibration components having the frequencies of not lower than the cutoff frequency, a damping force can be generated by the passive control under the dynamic braking of electric motor 8.

As appreciated from the above, in the electromagnetic suspension system according to the present invention, the electrical damping element is connected to the motor control circuit for the electric motor in a manner to be in parallel with the electric motor. Accordingly, for example, even during a motor control for the electric motor in the active manner in response to the displacement input from the sprung mass, a damping force in the passive manner can be developed under the dynamic braking of the electric motor, against the displacement input from the sprung mass. This not only simplifies the active control but also improves an energy efficiency, as compared with a conventional case where the attitude control and the vibration control are simultaneously carried out.

While the electromagnetic suspension system for a vehicle has been discussed with reference to the first and second embodiments, it will be understood that the details of constructions and arrangement of parts and elements of the electromagnetic suspension system are not limited to those in the first and second embodiments, so that changes and variations may be made without departing from the sprit of scope of the claims set forth after.

Although an example in which the electromagnetic actuator is employed in place of a shock absorber used in the multi-link type independent suspension system has been shown and described as the first embodiment of the electromagnetic suspension system, it will be appreciated that the electromagnetic actuator may be employed between sprung and unsprung masses of a variety of suspension systems such as strut type suspension systems.

While the first embodiment electromagnetic suspension system has been shown and described such that the actuator power output f according to the motor rotational angular velocity $\omega$ is calculated based on the motor rotational angular velocity $\omega$ and the actuator output characteristics shown in FIG. 6, it will be understood that the actuator power output f may be obtained by using any control rule of applicable actuator control rules, for example, by using the stroke velocity in place of the motor rotational angular velocity $\omega$ and by calculating the actuator power output in accordance with this stroke velocity and a linear or non-linear damping characteristics.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

The entire contents of Japanese Patent Application P2003-027857 (filed Feb. 5, 2003) are incorporated herein by reference.

What is claimed is:

1. An electromagnetic suspension system for a vehicle, comprising:

an electromagnetic actuator interposed between a sprung mass and an unsprung mass and disposed substantially in parallel with an spring element;

an electric motor for driving the electromagnetic actuator; and a motor controller configured to calculate a displacement input applied to the electromagnetic actuator and to control the electric motor in a manner that the electromagnetic actuator generates an optimum damping force corresponding to the displacement input;

a motor control circuit for the electric motor, through which the electric motor is connected to the motor controller; and an electrical damping element electrically connected to the motor control circuit and in parallel with the electric motor to generate a damping force in a passive manner under a dynamic braking of the electric motor in response to the displacement input to the electromagnetic actuator from the unsprung mass.

2. An electromagnetic suspension system as claimed in claim 1, wherein the electrical damping element is an electric resistor.

3. An electromagnetic suspension system as claimed in claim 2, wherein the electric resistor and the electric motor constitute a closed circuit which is equivalent to a damper having a damping coefficient of ke·km/(R+r) against the displacement input from the unsprung mass, in which ke is a proportional constant for an input velocity of an induced electromotive force generated by the electric motor; km is an output constant of the electric motor; R is a resistance value of the electric resistor connected in parallel with the electric motor; and r is an internal resistance value of the electric motor.

4. An electromagnetic suspension system as claimed in claim 1, wherein the electrical damping element is an electric resonance circuit which has a resonance frequency set to be coincident with a resonance frequency of the unsprung mass, and includes a resistor, a coil and a capacitor which are electrically connected with each other.

5. An electromagnetic suspension system as claimed in claim 4, wherein the motor controller is configured to set, as a cutoff frequency, a frequency lower than the resonance frequency of the unsprung mass and higher than a resonance frequency of the sprung mass; remove vibration components within a high frequency range not lower than the cutoff frequency; select, as an object to be controlled, only vibration components within a low frequency range including the sprung mass resonance frequency; and control the electric motor in an active manner to obtain an optimum damping force against the selected vibration components.

6. An electromagnetic suspension system as claimed in claim 1, wherein the electrical damping element is disposed at a site higher in cooling efficiency than an inside of a wheel house, or a site which requires a heat source.

7. An electromagnetic suspension system for a vehicle, comprising:

an electromagnetic actuator interposed between a sprung mass and an unsprung mass and disposed substantially in parallel with an spring element;

an electric motor for driving the electromagnetic actuator; and motor control means for calculating a displacement input applied to the electromagnetic actuator and controlling the electric motor in a manner that the electromagnetic actuator generates an optimum damping force corresponding to the displacement input;

a motor control circuit for the electric motor, through which the electric motor is connected to the motor control means; and an electrical damping element electrically connected to the motor control circuit and in parallel with the electric motor to generate a damping force in a passive manner under a dynamic braking of the electric motor in response to the displacement input to the electromagnetic actuator from the unsprung mass.

* * * * *